United States Patent [19]

Schmid

[11] Patent Number: 5,452,570

[45] Date of Patent: Sep. 26, 1995

[54] ATTACHMENT FOR BOW RAKE AND COMBINATION OF ATTACHMENT AND RAKE

[76] Inventor: Roy Schmid, 170 Autumn Dr., Southington, Conn. 06489

[21] Appl. No.: 114,154

[22] Filed: Sep. 1, 1993

[51] Int. Cl.$^6$ .................................................. A01D 7/10
[52] U.S. Cl. ................................. 56/400.07; 56/400.19
[58] Field of Search ........................... 56/400.04, 400.05, 56/400.07, 400.19

[56] References Cited

U.S. PATENT DOCUMENTS

| 1,414,087 | 4/1922 | Kenny | 56/400.04 |
| 3,206,921 | 9/1965 | Slaga | 56/400.07 |

FOREIGN PATENT DOCUMENTS 0166112  2/1934  Switzerland ...................... 56/400.07

*Primary Examiner*—Terry Lee Melius
*Attorney, Agent, or Firm*—Richard A. Craig

[57] ABSTRACT

An attachment is usable in combination with a standard unmodified bow rake having a tined member with a plurality of equally spaced like tines including first and second end tines, the tines being of predetermined length with aligned free ends. The attachment includes a plate mountable behind the tined member and having a straight bottom edge. The plate is adjustably positionable with the bottom edge in any of a plurality of positions to expose different effective lengths of the tines to control the depth of penetration of the tines into the ground, from zero to near the full actual length of the tines.

12 Claims, 3 Drawing Sheets

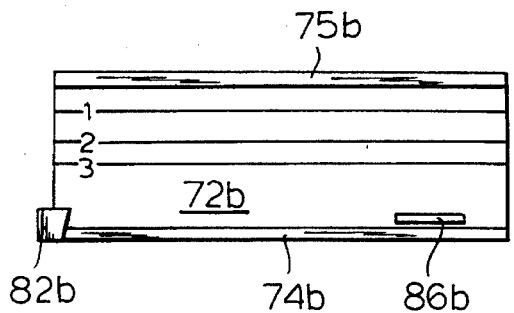
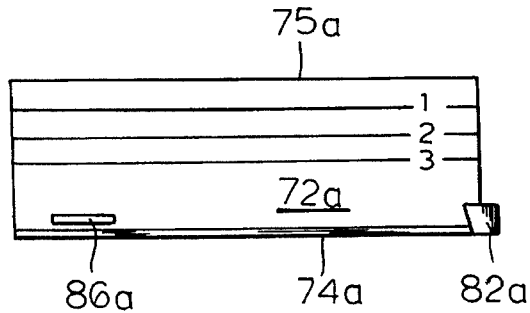
FIG.8　　　　　　　　FIG.9
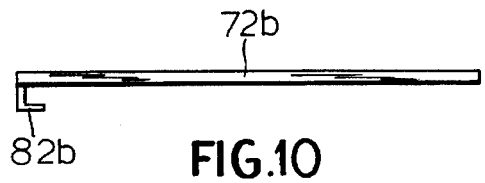
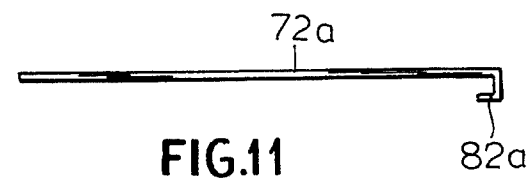
FIG.10　　　　　　　FIG.11
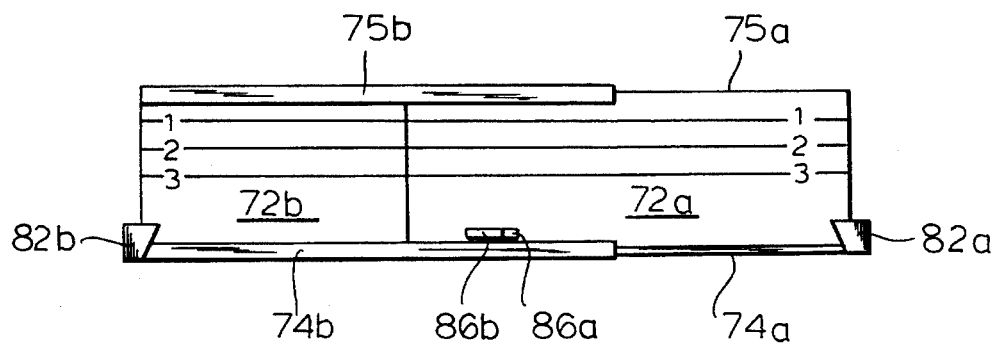
FIG.12
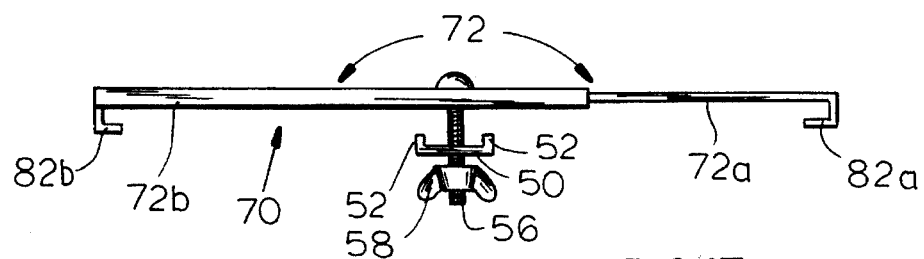
FIG.13

ATTACHMENT FOR BOW RAKE AND COMBINATION OF ATTACHMENT AND RAKE

BACKGROUND OF THE INVENTION

This invention relates to rakes and more particularly to bow rakes and still more particularly to an adjustable attachment for a bow rake that lets one use a bow rake to de-thatch a lawn without pulling up turf.

The invention also contemplates the combination of such attachment and a bow rake. It is still further contemplated that the attachment may be such that it is usable equally on bow rakes of more than one standard size, such as s standard 14-tins bow rake or a 16-tins bow rake. In any event, the inventive attachment is usable with standard bow rakes that are unmodified in any way.

The invention functions by allowing the user to adjust in extremely simple fashion the depth to which the tines can enter the ground, from zero to near full length of the tines or any intermediate depth, by providing a plate that is adjustably mountable back of the tined member of a bow rake. The plate gathers all loose debris such as thatch, small stones, as well as hard to rake things, such, particularly as maple keys. With the plate in its lowermost position, the tines have an effective length of zero and the rake becomes a broad bladed hoe, admirably suited for use as a new lawn leveler prior to seeding or for light gardening work.

Important objects of the invention are to provide an attachment for a standard bow rake, which is at once of utmost simplicity in structure and use, and which enhances the use of standard bow rakes in the manner set forth above and also the results obtainable therewith.

The following U.S. patents may be of interest but are not believed pertinent:

| U.S. Pat. No. | Date | Inventor | Title |
| --- | --- | --- | --- |
| 893,632 | August 20, 1907 | Peterson | Garden Rake Attachment |
| 992,515 | May 25, 1909 | Riley | Rake Attachment |
| 1,182,789 | May 9, 1916 | Perry | Self Cleaning Rake |
| 1,414,087 | April 25, 1922 | Kenny | Marking Attachment for Rake |
| 2,099,053 | November 16, 1937 | Donnan | Rake Attachment |
| 2,553,053 | May 15, 1951 | Rhett | Attachment for Rake |
| 2,780,976 | February 12, 1957 | Koering | Garden Tool |

Peterson is a rake attachment of wire or rod stock to prevent tines from working too deep. Two members telescopically engage each other so that the attachment is adjustable for rake width only. There is no adjustment for controlling depth of penetration of tines into the ground.

Riley presents a rake attachment with teeth and a cleaning bar for removing matter collected on the tines whenever the rake is raised from the ground. There is no adjustability anf Riley is unconcerned with the problems addressed and solved by the present invention.

Perry is concerned with self-cleaning rakes and presents a cleaning attachment movable lengthwise of the rake tines, the motion unclogging the tines. There is no adjustability.

Kenny is a marking attachment for rakes. Marking blades 14 and 15 project laterally an adjustable distance from each other, so that plants may be planted apart a predetermined yet adjustable distance. Suitable hardware secures the attachment in desired location.

Donnan discloses a rake attachment mounted on the rake head, more particularly the tines, such that the tines rake old dead grass without harming good new grass. There is no adjustability. Significantly, the attachment has a body member 9 of vulcanized rubber providing teeth 10 covering tines 8 and rendering same inoperable.

Rhett relates to a rake head attachment comprising a plurality of elements between the teeth of the rake, one such element being between each pair of adjacent teeth. Means move the elements to dislodge articles from between the teeth. Nothing is capable of adjustment.

Koering teaches a cultivator hoe with attachments whereby different varieties of garden tool may be effected by selecting and attaching one of the attachments to the hoe. The cultivator hoe has a plurality (four, as shown) of conventional configurations with pointed ends. The tines at opposite ends of the hoe are externally threaded, whereby the hoe is a special item, not per se available. A cutting blade 22 comprises a plate 24 having cylindrical sleeve elements to receive the externally threaded tines. The cutting edge of cutting blade 22 is adjustably positionable with respect to the free ends of the tines by manipulation of nut members 34 as desired to meet conditions. A modification shown in FIGS. 5 and 6 does not teach adjustably applying a plate to a standard, unmodified item.

SUMMARY OF THE INVENTION

The invention presents an attachment usable in combination with a standard, unmodified bow rake having a rigid tined member with a plurality of equally spaced tines of predetermined length and aligned free ends and including first and second end tines. Typically, bow rakes have an even number of tines, 14-tins and 16-tins bow rakes being con, men. The attachment includes a plate that is mountable behind and against the tined member and having a straight bottom edge. Tha plate is adjustable with its bottom edge in any of a plurality of positions that are continuously variable to expose different effective lengths of the tines to control the depth of penetration of the tines into the ground, from zero up to substantially the full length of the tines. Thus, a user is enabled, by proper adjustment of the plate, to de-thatch a lawn without pulling up turf.

Further, the plate has a hole therethrough and the attachment also comprises clamping means that include a clamp member having an aperture therethrough, a bolt and a wing nut, the bolt having a threaded shank, so that the shank can be passed through the hole through the plate, and thence between an adjacent pair of tines and thence through the clamp member aperture and finally into threaded engagement with the wing nut to clamp the plate between the bolt head and the nut with the bottom edge of the plate in predetermined adjusted position relative to the free ends of the tines.

The plate is uniformly bent adjacent the straight bottom edge, so that when the attachment is assembled with the rake, the bottom edge will be rigidly against the tines to prevent buildup of thatch or other debris on the tines and to provide a shoe for supporting the rake as it is drawn across the ground. The plate else has wraparound end tabs to receive the first and second end tines to hold the plate against the tined member with some force with the bottom edge parallel to or coincident with the free ends of the tines.

In a first preferred embodiment the plate is of one piece construction while in a second preferred embodiment the plate is of two piece construction and the two pieces or plate members may be telescopically assembled whereby the length of the plate is adjustable. The second preferred embodiment is usable with bow rakes of more than one size.

The plate has a plurality of leveling indicia parallel to the bottom edge to assist a user in securing the plate in desired position with respect to the tined member.

The invention also embraces a combination of s bow rake and an attachment that is a plate mounted behind the tined member and with a straight bottom edge. The plate is rigidly secured to the tined member by clamping means in releasable fashion with the bottom edge in predetermined but variable relationship to the free ends of the tines.

The manner in which the invention attains the stated objects and advantages will appear more clearly hereinafter.

DESCRIPTION OF THE DRAWING

FIGS. 8 and 9 are elevations of two members that provide the plate of a preferred attachment that is a second preferred embodiment of the invention;

FIGS. 10 and 11 are plan views of the members of FIGS. 8 and 9, respectively;

FIG. 12 is a front view of the members of FIGS. 8 and 9 assembled to provide the plate of the second preferred embodiment; and FIG. 15 is a top view of the second preferred embodiment.

DESCRIPTION OF THE INVENTION

Figure 1:
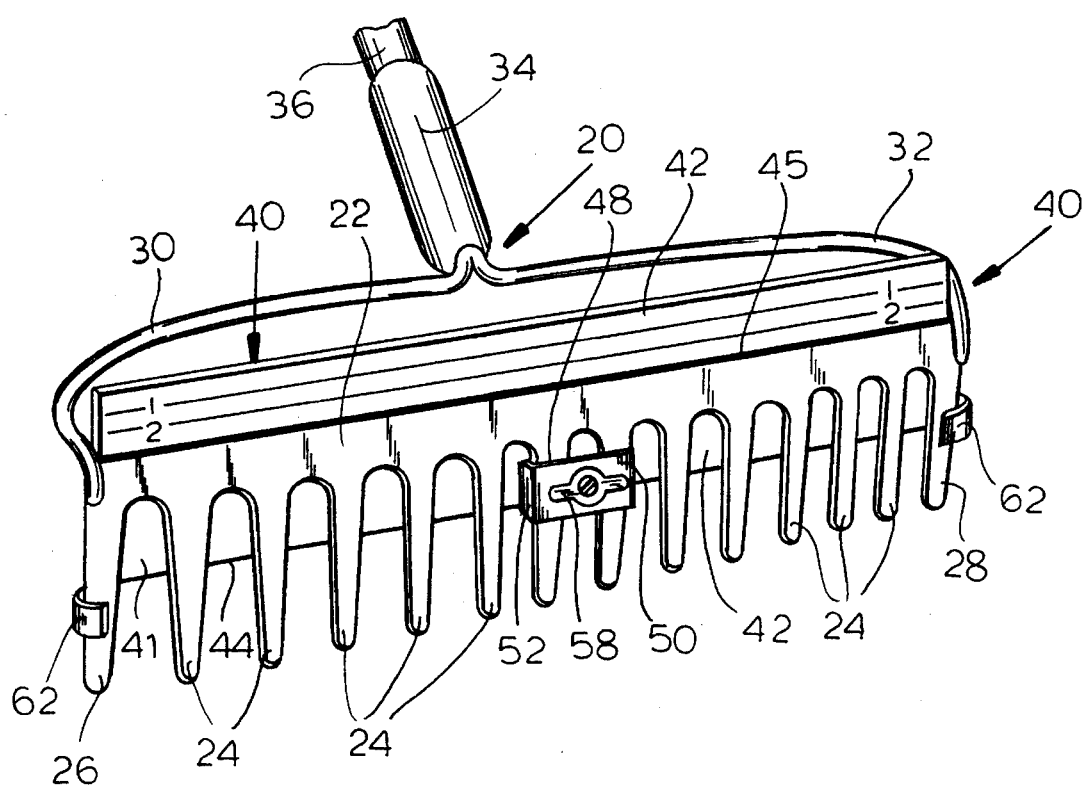
FIG. 1 is a perspective view of the operative portion of a standard bow rake with a first preferred attachment according to the invention.
Figure 2:
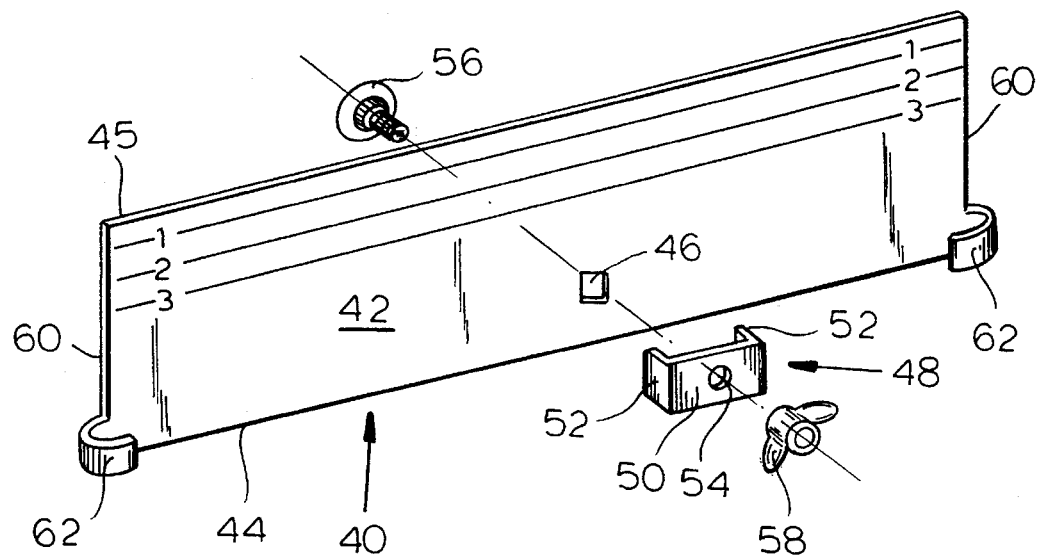
FIG. 2 is an exploded perspective view of the attachment of FIG. 1.
Figure 3:
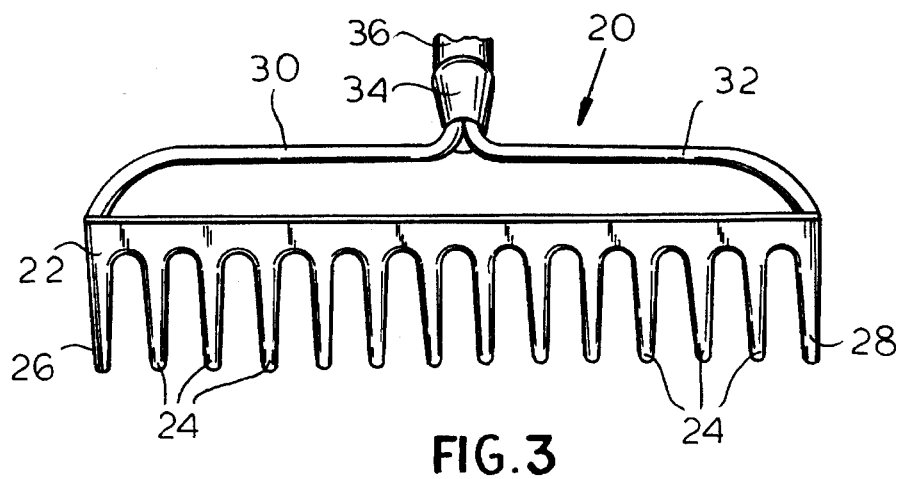
FIG. 3 is a front view of the head of the bow rake of FIG. 1.

FIGS. 1 and 2 show a standard unmodified bow rake 20 having a rigid tined member 22 with a plurality (fourteen as shown) of like rigid tines, i.e. twelve intermediate tines 24 and first and second end tines 26 and 28. Rake 20 is thus a 14-tins bow rake, and as is typical, the spacing of each tine from its one neighbor or two neighbors is uniformly about 1 inch (2.54 cm.), and the center-to-center distance between end tines 26 and 28 is about 13 inches (33.02 cm). Tines 24, 26 and 28 have free ends defining a straight line.

A 16-tins bow rake (not shown) with sixteen equally spaced like tines including fourteen intermediate tines and first and second end tines, with the same tins size and spacing as rake 20 is also standard and common. In the standard 16-tins bow rake, the distance between the first and second end tines is about 15 inches (38.1 cm). The significance of the difference in this regard between the standard 14-tins bow rake, i.e. bow rake 20, and the standard 16-tine bow rake, will be brought out.

Bow rake 20 also includes arms 50 and 52, a sleeve 54 open at both ends and a handle 56. Arms 50 and 52 extend from opposite ends of tined member 22 toward and into one end of sleeve 54 and handle 56 extends axially from the other end of sleeve Arms 30 and 32 are substantially mirror images of each other whereby rake 20 is symmetrical with respect to handle, extending equally on both sides thereof.

Tined member 22 and arms 50 and 52 are sometimes referred to herein as the head of bow rake 20.

Figure 4:
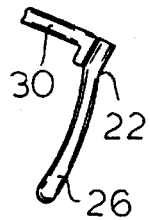
FIG. 4 is a fragmentary end view of the head of the bow rake of FIG. 1.

FIG. 4 is a fragmentary end view of the head of bow rake 20, showing the configuration of tins 26 (or any other tins).

FIGS. 1, 2, 5, 5A, 6 and 7 illustrate an attachment 40 that is a first preferred embodiment of the invention. Attachment 40 comprises a plate 42 (FIGS. 1, 2, 5, 5A and Plate 42 is mountable behind tined member 22 and has a straight bottom edge 44 and a straight top edge 45 parallel to bottom edge 44. Plate 42 is adjustable relative to tined member 22 to position bottom edge 44 in predetermined relationship with respect to the free ends of all tines 24, 26 and 28.

More particularly, bottom edge 44 of plate 42 is positionable to expose the free ends of tines 24, 25 and 28, or various lengths of tines 24, 25 and 28 adjacent those free ends, as may be desired by the user for the job at hand. It is even possible, if desired, to position plate 42 low enough to cover the free ends of tines 24, 25 and 28, in which case rake 20 becomes a broad bladed hoe. In other words, the invention gives the user control over the effective length of tines 24, 25 and 28, from zero all the way up to substantially the full actual length thereof. The manner in which this result is obtained by the invention will now be brought out. Plate 42 has a small rectangular (square as shown in FIGS. 1 and 5) hole 46 therethrough a short distance above bottom edge 44 and centrally located between the ends of plate 42.

Attachment 40 further comprises clamping means including a clamp member 48 with a body portion 50 and mirror image side flanges 52 bent in the same direction from opposite side edges of body portion 50 which has a central clearance hole therethrough. The clamping means also comprises a carriage bolt 56 and a wing nut 58 of the same thread size as bolt 56 so as to be threadedly engageable therewith, and an external wrenching configuration that is typical of carriage bolts.

Plate 42, which is of one piece construction, has end edges 60 perpendicular to and joining bottom edge 44 and top edge 45. Extending from each end edge 60 and vertically limited to a location near bottom edge 44 are wraparound end tabs 62 adapted to receive first and second end tines 26 and 28 therein to hold plate 42 behind timed member 22 except for the parts of tabs 62 that are wrapped around end tines 26 and 28, this relationship being clearly shown in FIG. 1.

Figure 5:
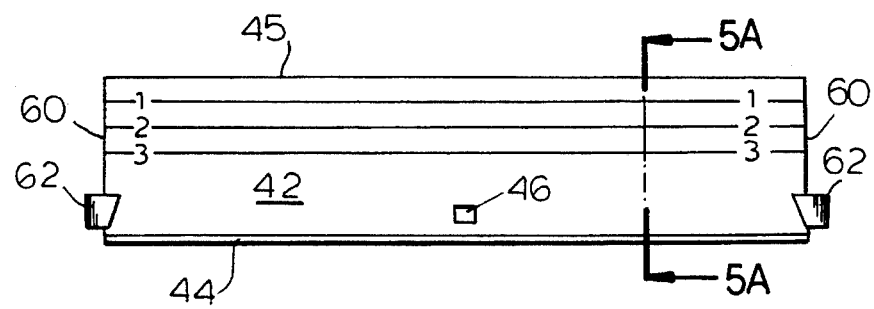
FIG. 5 is a front view of a plate that is part of the FIG. 1 attachment.

Plate 42 further has a front surface, this being the surface facing the reader in FIGS. 1, 2 and 5. The front surface carries a plurality of leveling indicia parallel to bottom edge 44 and top edge 45. The leveling indicia are identified as 1—1, 2—2 and 3—3 in FIG. 2. Indicia 1—1 and 2—2 are also visible in FIG. 1. The leveling indicia are shown as solid lines, but they could be broken lines or they could assume different forms. Of whatever form, the leveling indicia can be used for assistance in securing plate 42 in the optimum location relative to timed member 22 for the job at hand.

Figure 7:
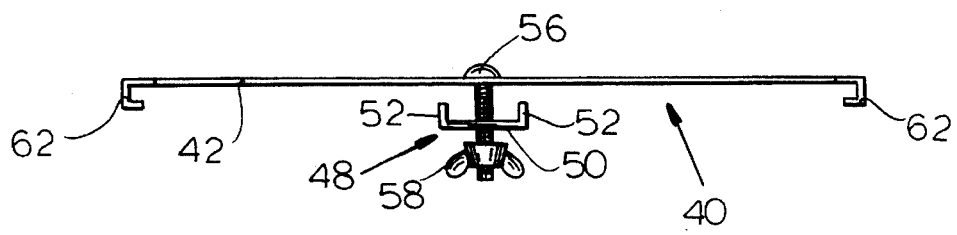
FIG. 7 is a top plan view of the first preferred attachment.
Figure 6:
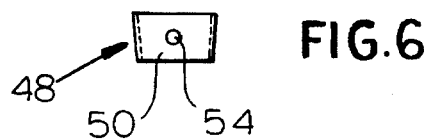
FIG. 6 is a front view of a clamp member that is part of the FIG. 1 attachment.

It is a simple matter to assemble attachment 40 as shown in FIG. 7, with tined member 22 of rake 20. One need merely turn assembly 40 from the FIG. 7 position to the FIG. 5 position and move it upwardly so that the front surface of plate 42, i.e. the surface bearing the leveling indicia, confronts the back side of timed member 22, with wing nut 58 facing the user and the threaded shank of carriage bolt 56 entering the gap-between that pair of tines 24 that are most remote from end tines 26 and 28, i.e. the gap that is half, ray between end tabs 62.

Figure 5A:
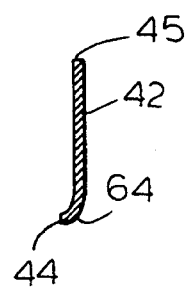
FIG. 5A is a section on line 5A—5A of FIG. 5.

Plate 42 is made of somewhat springy material. As seen in FIG. 5A, along its bottom edge 44, plate 42 is bent slightly out of the plane of its front side. This bend, indicated at 64, assures that bottom edge 44 will be held somewhat forcibly against the rake tines, thus to minimize or avoid buildup of thatch or other debris on the rake tines and to provide a shoe for supporting the rake as it is drawn across the ground.

Attachment 40, as stated, is a first preferred embodiment of the invention. It is well suited for use with the standard 14-tins bow rake, but is unusable with the standard 16-tins bow rake as described above. The 16-tins bow rake would require a different attachment.

FIGS. 8—13 illustrate an attachment 70 that is a second preferred embodiment of the invention. The second preferred embodiment is equally usable with a standard 14-tine bow rake such as bow rake 20 or with a standard 16-time bow rake (not shown) or possibly other standard bow rakes.

FIG. 13 is a top view of attachment 70 that utilizes a plate that is of two piece construction, wherein the two pieces are adapted to be in telescopic assembly with each other to make the length of the plate adjustable. Attachment 70 comprises clamp member 50, carriage bolt 56 and wing nut 58 that are common to attachment 40. Attachment 70 further comprises a plate 72 that differs from plate 72 of attachment 40 in that plate 72 is provided by two plate members 72a and 72b and hence is of two piece construction instead of the one piece construction of plate 42. Plate members 72a and 72b are capable of telescopic assembly with each other to provide a plate of adjustable length.

Plate member 72a has bottom and top edges 74a and 75a, respectively, that are similar to bottom and top edges edges 44 and 45, respectively, of plate Plate member 72b is similar to plate member 72a, but plate member 72b has bottom and top edges 74b and 75b, respectively, that are folded over to provide a bottom track and a top track, respectively, adapted to receive bottom and top edges 74a and 75a, respectively, of plate member 72a in a freely sliding fit. The front surfaces of plate members 72a and 72b bear leveling indicia 1—1, 2—2 and 3—3 as is the case with plate 42.

Plate members 72a and 72b have end tabs 82a and 82b, respectively, that are like end tabs 62 of attachment 40, that are adapted to receive the end tines of a bow rake, which could be bow rake 20, but which could alternatively be a standard 16-fine bow rake, by virtue of the fact that plate members 72a and 72b are in sliding telescopic engagement with each other thus to provide a plate of selectively variable length.

Plate members 72a and 72b are so are provided near their bottom edges with apertures 86a and 86b, respectively. At least one of apertures 86a and 82b is elongated, and as shown both are elongated. In any case, apertures 86a and 86b cooperate to furnish an opening for receiving the shank of carriage bolt 56 in a fairly wide range of relative positions of plate members 72a and 72b, at least for accommodating standard 14-fine and standard 16-tins bow rakes.

It is apparent that the invention well attains the stated objects and advantages, among others.

The disclosed details are exemplary only and are not to be taken as limitations on the invention, except as those details may be included in the appended claims.

What is claimed is:

1. An assembly comprising in combination a bow rake having a tined member with a plurality of like tines of predetermined length and with aligned free ends including first and second end tines, and an attachment including a plate having a straight bottom edge, and means clamping said plate securely against said tines with said bottom edge in adjustable position with respect to said free ends of said tines, said plate being behind said tined member and having wrapsaround end tabs containing said first and second end tines.

2. An assembly according to claim 1 wherein said bottom edge is positionable to expose the free ends of the tines and various lengths of the tines adjacent the free ends, as desired.

3. An assembly according to claim 1 wherein said plate has a hole therethrough and said attachment further comprises clamping means including a clamp member having an aperture therethrough, a bolt and a wing nut, said bolt having a head and a threaded shank, whereby said shank can be passed through said hole and thence between an adjacent pair of the tines and through said aperture and into threaded engagement with said nut which is turnable on said bolt to clamp said plate between said bolt head and said nut with said bottom edge in desired adjusted position relative to the free ends of the tines.

4. An assembly according to claim 1 wherein said plate is uniformly bent adjacent its said straight bottom edge, so that said bottom edge is held forcibly against the tines to prevent buildup of thatch or other debris on the tines and to provide a shoe for supporting the rake as it is drawn across the ground.

5. An assembly according to claim 1 wherein said plate has a plurality of spaced leveling indicia parallel to said bottom edge to assist in securing said plate in desired position with respect to said tined member.

6. An assembly according to claim 5 wherein said indicia are lines.

7. An assembly according to claim 6 wherein said lines are solid.

8. An assembly according to claim 6 wherein plate further has a straight top edge parallel to said bottom edge.

9. An attachment for use with a standard bow rake having a tined member with a plurality of equally spaced like tines of predetermined length and with aligned free ends and including first and second end tines, said attachment comprising a plate mountable behind the tined member and having a straight bottom edge adapted to be in predetermined but variable relationship with respect to the free ends of the tines, said plate having wraparound end tabs for receiving the first and second end tines to hold said plate with said bottom edge rigidly engaging the tines and parallel to or coincident with the free ends of the times.

10. An attachment according to claim 9 wherein said plate is of one piece construction.

11. An attachment according to claim 9 wherein said plate is of two piece construction, said two pieces being adapted for telescopic assembly with each other whereby the length of said plate is adjustable and said attachment is usable with bow rakes of different sizes.

12. An attachment according to claim 11 wherein at least one of said two pieces has an elongated hole therethrough to facilitate securing said plate to said tined member.

* * * * *